Jan. 11, 1955  W. BLACK  2,699,236
HYDRAULIC TRANSMISSION
Filed Aug. 15, 1950

INVENTOR.
WILLY BLACK
BY

United States Patent Office 2,699,236
Patented Jan. 11, 1955

2,699,236

HYDRAULIC TRANSMISSION

Willy Black, Herzberg, Germany, assignor to Anmelders Auf Die Firma Carl F. W. Borgward G. m. b. H., Bremen, Germany, a firm of Germany Application August 15, 1950, Serial No. 179,501
In Germany October 1, 1948

Public Law 619, August 23, 1954
Patent expires October 1, 1968

5 Claims. (Cl. 192—3.2)

This invention relates to an improvement in transmissions for automotive road vehicles.

Ever since the advent of the "Föttinger-Transformator" many attempts have been made to make use of this type of device as an automatic fluid transmission for motor vehicles in place of the usual gear type transmissions now in general use. However, because of its more or less complicated construction, weight and cost, it has heretofore only been used, with few exceptions, on track vehicles, such as railway cars, locomotives and the like, or alternatively in cross country vehicles, city buses or custom built automobiles.

Accordingly, a primary object of the invention is to provide a hydraulic transmission which has all of the advantages of the "Föttinger" type transmission but by a simplified construction and resulting reduction in weight makes the principles and advantages of the transmission referred to more readily available and adaptable to motor vehicles of the road type in general. In other words, the present invention embodies the advantages of the "Föttinger" type transmission in a construction which is relatively simple and requires a relatively small number of parts while utilizing the operational advantages of the "Föttinger" transmission within a smaller space, less weight and lower cost as compared with the "Föttinger" type transmissions heretofore used, or standard gear type transmissions.

A further object of the invention is to provide a hydraulic transmission of the type referred to which eliminates the complicated special braking and coupling elements heretofore used, and, in their place utilizes a relatively simple arrangement wherein the necessary braking action is obtained in a simple and practical manner.

A preferred and practical embodiment of the invention is shown in the accompanying drawings in which.

Similar references designate corresponding parts throughout the several figures of the drawings.

Figure 1:
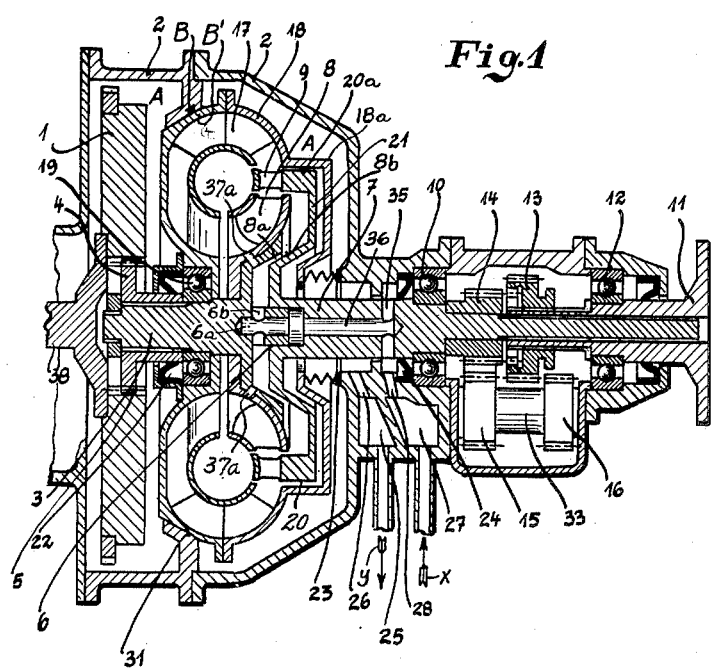
Fig. 1 is an axial section through the transmission in a position in which the transmission of power is effected through the fluid medium.

As will be seen from the drawings, the invention includes in its organization a flywheel 1 driven by motor shaft 38. A transmission housing 2 of any appropriate form is rigidly connected in the conventional manner to the motor block or housing. The transmission housing 2 provides a chamber A for housing the fluid motor assembly and the flywheel, and as shown, a portion of said housing includes a braking surface B which may be of annular form and of any appropriate surfacing to act as a friction brake, in cooperation with the braking surface B' of a so-called circulation casing 18. These two surfaces B and B' are engaged in Fig. 1 which shows the position of parts in starting the vehicle.

The flywheel 1 is directly connected with a primary drive shaft 3 by a slidable or spline-type connection effected through a gear 4 carried by the primary drive shaft and engaging with an annular rack 5 formed axially in the flywheel. Thus, the primary drive shaft 3 is longitudinally displaceable, within predetermined limits, relative to the flywheel for reasons which will hereinafter more fully appear. The primary drive shaft 3 is provided with a reduced end portion 6 having axial and radial ports 6a and 6b, respectively, the said reduced portion fitting into a socket formed in a secondary drive shaft 7, which is also provided with ports, as will presently appear. It will thus be seen that the primary drive shaft is axially displaceable relative to the secondary drive shaft, which is non-displaceable longitudinally as heretofore set forth. In addition, the primary drive shaft 3 carries rigidly, to rotate therewith, an impeller or pump wheel 8. It will, therefore, be understood that the primary drive shaft and the impeller wheel move together for axial movement relative to the secondary drive shaft 7.

It may be also pointed out that the impeller wheel is provided with relief ports 37a for a purpose which will presently become apparent. The impeller wheel assembly, connected to shaft 3, is provided with a clutch face 8a intended to have a clutching engagement with a companion part 8b on the bottom wall 21 of a turbine wheel 9.

The secondary drive shaft 7 is mounted to be longitudinally non-displaceable, as previously set forth, in the gear housing connected to the transmission housing by means of the ball bearing 10, and is further supported in the sleeve of the flanged coupling plate 11, which sleeve in turn is mounted in the ball bearing 12. By means of the shiftable wheel 13, the flanged sleeve or shaft 11 can be coupled with the secondary drive shaft 7, or it may be driven by said shaft in reverse through the gears 14, 15, 16 and the aforesaid shiftable or slidable gear 13, and an intermediate wheel, not shown. This reverse gearing is more or less conventional, and it will be understood that suitable packings may be used at appropriate points to retain lubricant.

Freely rotatable on the primary drive shaft 3, there is provided a guide wheel 17 rigidly connected with circulation casing 18, which encloses the fluid circulation system.

This casing is rotatably mounted on the primary drive shaft 3 by ball bearing 19. As previously stated, the drive shaft carries therewith the impeller 8 so that the casing 18 and the said impeller move together axially. When the casing 18 is moved in one direction the braking surface B' engages the braking surface B of the housing 2 to provide a reaction member when it is necessary to use torque conversion. On the other hand, when casing 18 moves in the other direction the clutching surface 8a and 8b, respectively, of the casing and turbine become engaged for direct drive.

It is also pointed out that there is a throttling passage 20 between the outer face of the flange 20a which forms part of the turbine wheel 9 and the adjacent face of the wall 18a of casing 18. Since the turbine wheel 9, flange 20a and turbine bottom wall 21 are all integral and are carried by the secondary drive shaft 7, it will be understood that all of these parts are relatively non-displaceable with respect to the displaceable drive shaft 3 and its impeller wheel assembly 8. It will also now be seen that the mating clutch face 8b previously referred to is formed on the inclined portion of turbine bottom wall 21 for cooperation with the clutch face 8a of the impeller wheel.

The secondary drive shaft 7 is provided with a longitudinal bore 36, which bore extends from the socket end to radial ports 35 and forms therewith a continuous passage. A flexible diaphragm type fluid tight connection 23 is provided between the housing 2 and the rear vertical wall 18b of casing 18 to surround the portion of the secondary drive shaft leading to the main drive shaft 3.

The portion of the circulation casing 18 adjacent the reverse gear housing is also provided with fluid chambers and ports which will be referred to in the description of the operation of the device which is as follows:

The transformer or fluid power converter which is enclosed by the circulation casing 18 is kept constantly filled by means of a small return pump (not shown) driven directly by the motor, or by primary drive shaft 3. A certain quantity of the operating fluid is always in circulation in order to eliminate heat from the transformer. If necessary, a cooling unit or heat exchanger may be inserted in the circuit including the transformer and return pump.

As previously indicated the transformer is sealed by packings 22, 23 and 24 so that inflow and outflow of the operating fluid can take place only through chamber 25 and bore 26, or through chamber 27, bore 28, and bores 35, 36, 37 and 6a—6b, respectively. In either direction, the fluid must flow through the throttling passage 20, whereby a higher pressure is created on one or the other side of the turbine wheel bottom 21 depending on the direction of flow. However, since the turbine wall 21 is fixed so that it cannot move in a longitudinal direction relative to the housing 2, due to the secondary drive shaft 7 mounted in bearings 10 and 12, this pressure causes circulation casing 18, and with it primary drive shaft 3 and impeller wheel 8 to be displaced in one or the other direction, depending upon the direction of flow of the operating fluid.

The longitudinal movement of the circulation casing 18 relative to the turbine wheel is limited in one direction (toward the left in Fig. 1) by the engagement of braking surface B' of the circulation wheel with the braking surface B of the housing 2. In the other direction, the movement of the circulation casing 18 is limited by the engagement of the clutch faces 8a and 8b as shown in Fig. 2.

With the transformer in operation, that is, when starting to move the static load, the parts assume the position shown in Fig. 1, and under these circumstances the operating fluid passes in the direction of the arrow x through chamber 27, bore 28, bore or port 35, bores 36, 37, 6a and 6b into the circulation system and flows out under the resistance of the throttling passage 20, through bore 26 and chamber 25 in the direction of the arrow y. The higher pressure thus resulting on the left hand side of the turbine bottom, relative to the right side, pushes circulating casing 18 toward the left (Fig. 1) to cause the braking surfaces B and B' to engage. Both surfaces are of conical shape at their point of contact with the result that they are coupled together by thrust pressure and the circulating casing 18 is braked fast by the transmission housing 2.

Figure 2:
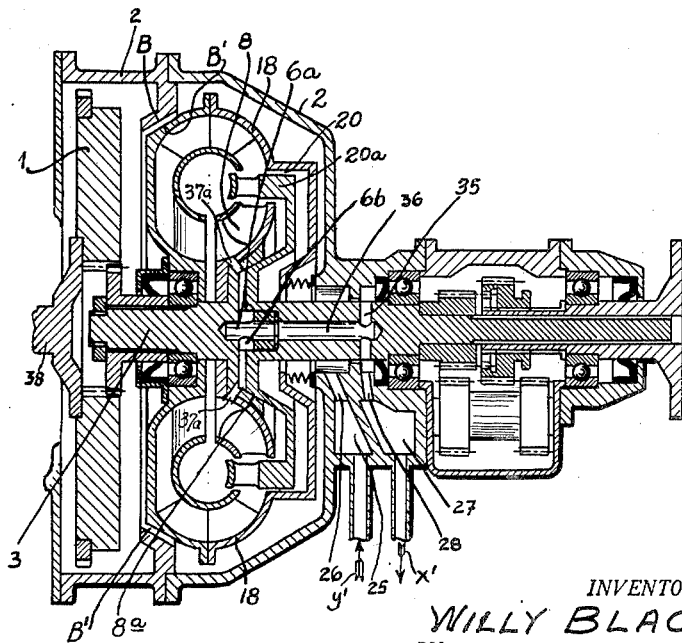
Fig. 2 is a similar section showing the position of parts to effect direct drive.

On the other hand, when power is transmitted directly, the parts assume the positions shown in Figure 2. To accomplish this the operating fluid is forced into the circulation casing 18 in the reverse direction, that is, the fluid is forced, in the direction of arrow y', into the chamber 25, through the bore 26, into the space between the wall 18a of the circulation casing and the wall 21 of the turbine, and thence the fluid flow encounters the resistance offered by the throttling passage 20. Since the fluid flow is throttled by passage 20, a higher pressure is built up on the right-hand side of the turbine bottom than on the left-hand side. The pressure differential causes the circulation casing 18, together with the primary drive shaft 3 and the impeller 8 to move to the right until the impeller surface 8a engages surface 8b of the turbine bottom. Since the engagement of surfaces 8a and 8b would shut off the return flow of the operating fluid, the impeller wheel 8 has been provided with relief ports 37a through which the returning fluid flows into radial ports 6a and 6b, thence into bores 37, 36, and 28 into chamber 27.

The surfaces 8a and 8b of the turbine wheel bottom are designed as cones fitting into each other so that the two parts are coupled together as the result of thrust pressure. Thus, a direct and positive mechanical connection is brought about between the primary drive shaft and the secondary drive shaft. The circulation casing 18 is naturally moved to the right as shown in Fig. 2 so that the braking surface B' is moved out of contact with its mating surface B on the transmission housing 2 and can now rotate freely with the turbine wheel and impeller wheel so that the transformer is by-passed without loss of power.

The principle of the invention permits of various structural modifications. For example, the known forms of the transformer may be varied and the reversed gear may be designed as a planetary gear, or any other suitable gear arrangement may be provided. Also, the points at which the circulation casing 18 engages with the transmission housing 2 and the points at which the turbine wheel 9 engages with the impeller wheel may be varied with respect to location and design. Special friction surfaces or special friction linings may be provided between the braking or clutch surfaces, or the shape thereof may be altered.

I claim:

1. A fluid transmission for motor vehicles and the like, comprising, a transmission housing having an internal braking surface thereon, a primary drive shaft mounted for axial displacement, a fluid containing circulation casing rotatable on the primary drive shaft and having a braking surface adapted for engagement with the braking surface of the transmission housing an impeller wheel on said primary drive shaft and movable with the circulation casing, a guide wheel in the circulation casing, a ported secondary drive shaft mounted to be longitudinally non-displaceable relative to the primary drive shaft, a turbine wheel on the non-displaceable secondary drive shaft operable in the circulation casing, a turbine bottom carrying said turbine wheel and fixed to the secondary shaft, complementary clutching surfaces respectively on the adjacent faces of the impeller wheel and the turbine bottom, and means for selectively impressing a fluid pressure differential on one side of the turbine wheel relative to the other side to cause axial displacement of the circulation casing and the impeller wheel whereby the said braking surfaces are engaged and disengaged and said clutching surfaces are disengaged and engaged.

2. A fluid transmission, comprising, a fixed transmission housing, an internal braking surface thereon, a primary drive shaft mounted in the transmission housing for relative axial displacement, a secondary drive shaft axially non-displaceably mounted in the transmission housing, a circulation casing mounted on the primary drive shaft for relative rotation thereto, said circulation casing being axially movable with the primary drive shaft and having a braking surface for engagement with the braking surface of the transmission housing, an impeller wheel secured to said primary drive shaft, said impeller wheel having a clutching surface, a turbine wheel carried by the secondary shaft and mounted in said circulation casing, said turbine wheel having a clutching surface adapted for engagement with the clutching surface of said impeller wheel to produce direct connection between the primary and secondary drive shafts, means forming fluid passages in the primary drive shaft and secondary drive shaft communicating with the circulation casing on opposite sides of the turbine wheel, and means for selectively impressing a fluid pressure differential on one side of the turbine wheel relative to the other side to cause axial displacement of the circulation casing and the impeller wheel, whereby said braking surfaces and said clutching surfaces are engaged and disengaged.

3. A fluid transmission, comprising, a relatively fixed transmission housing, including a chamber and shaft bearings, an annular braking surface in the housing, a flywheel connected to a source of power and having an axial opening provided with an annular rack, a primary drive shaft having a gear at one end for meshing with the rack of the flywheel, said primary drive shaft being axially slidable while said gear is engaged with the rack of the flywheel and interlocked therewith for rotational movement, a circulation casing mounted on the primary drive shaft for relative rotation thereto and axially movable relative to the housing, a braking surface on said circulation casing for cooperation with the braking surface on the transmission housing, an impeller wheel assembly in the casing and rigidly connected with primary drive shaft, said impeller wheel assembly having relief ports, a clutching surface on the impeller wheel assembly, said primary drive shaft having an axial ported extension at the end opposite said gear, a secondary drive shaft journalled in the housing against axial displacement and having a socket for receiving the ported end of the primary drive shaft and also having axial and radial ports, a turbine wheel in the circulation casing and including a bottom wall carried by said secondary drive shaft and having a turbine portion for cooperation with the impeller wheel assembly, said turbine bottom having a clutching surface adapted to be engaged by the clutching surface on the impeller wheel assembly, flexible sealing packing means between one side of the circulation casing and the transmission housing where the same surrounds the secondary drive shaft, means in the housing forming separate fluid chambers, one of said chambers having a port communicating with the radial ports of the secondary drive shaft and the other of said chambers having a port communicating with the interior of the circulation casing through the said flexible sealing packing connection, and means for selectively impressing a fluid pressure differential on one side of the turbine wheel relative to the other side to cause axial movement of the circulation casing and the impeller wheel, whereby said braking surfaces are engaged and disengaged and said clutching surfaces are disengaged and engaged.

4. A fluid transmission, comprising, a relatively fixed transmission housing including a chamber in one portion and shaft bearings in the other portion, an annular braking surface formed in said housing, a flywheel having an axial internal rack, a primary drive shaft including a gear at one end slidable in the rack upon axial displacement of said shaft, said shaft having an extension including axial and radial ports, a circulation casing mounted on the primary drive shaft for relative rotation thereto, said circulation casing being axially movable within the transmission housing and having an external braking surface adapted for engagement and disengagement with said braking surface of the transmission housing, a secondary drive shaft journalled in the transmission housing and having a socket for receiving the extension of the primary drive shaft and also provided with axial and radial ports, said secondary drive shaft being rotatably and axially non-displaceably supported in the transmission housing, an impeller wheel assembly rigid with the main drive shaft and having an external clutching surface, a turbine including a bottom wall rigidly carried by the secondary drive shaft, a clutching surface on the turbine bottom wall, means for conducting fluid into the space between the rear face of the impeller wheel assembly and the inner side of the turbine bottom wall, and into the turbine wheel thereby to move the impeller wheel assembly out of engagement with the clutching surface of the turbine wheel assembly and force the circulation casing to engage the transmission housing to arrest the former's rotational movement, and other means for conducting fluid into the space between the inner side of the rear wall of the circulation casing and the related side of the turbine bottom wall to cause the circulation casing to move away from the transmission casing and also to cause the clutching surfaces of the impeller wheel and turbine wheel to engage for direct drive.

5. A fluid transmission, including, a fixed transmission housing, a braking surface on said housing; a fluid coupling axially movable in the housing and including a circulation casing, a braking surface on the casing, a guide wheel, an impeller wheel, and a clutching face on the impeller wheel; an axially non-displaceable turbine wheel having a clutching face for engagement with the clutching face on the impeller wheel, and means for controlling the passage of fluid between the turbine wheel and the impeller wheel to cause the circulation casing to move relative to the housing to cause the braking surface of the circulation casing to engage the braking surface of the transmission housing and provide a reaction member when it is necessary to use torque conversion.

References Cited in the file of this patent

UNITED STATES PATENTS

| | | |
|---|---|---|
| 1,960,705 | Kochling | May 29, 1934 |
| 2,226,802 | Black | Dec. 31, 1940 |
| 2,279,019 | Black | Apr. 7, 1942 |